(12) United States Patent
Chiu et al.

(10) Patent No.: US 6,884,369 B2
(45) Date of Patent: Apr. 26, 2005

(54) MOLD AND A METHOD OF HOT-FORMING A THERMOPLASTIC LENS

(75) Inventors: Hao-Wen Chiu, Clearwater, FL (US); Hsinjin Yang, Palm Harbor, FL (US); Matthew Lockwood, Palmetto, FL (US)

(73) Assignee: Essilor International (Compagnie Generale d'Optique, Charenton le Pont (FR)

( * ) Notice: Subject to any disclaimer, the term of this patent is extended or adjusted under 35 U.S.C. 154(b) by 370 days.

(21) Appl. No.: 10/015,587

(22) Filed: Dec. 17, 2001

(65) Prior Publication Data

US 2003/0111747 A1 Jun. 19, 2003

(51) Int. Cl.[7] .................. B29D 11/00; B29C 33/02; B29C 37/02; B28B 1/00; B29B 13/02
(52) U.S. Cl. .................. 264/1.1; 264/2.4; 264/2.7; 264/296; 264/327; 425/407; 425/808; 425/DIG. 110; 425/DIG. 246
(58) Field of Search ............... 264/1.24, 1.32, 264/1.7, 1.38, 1.8, 24, 2.7, 296, 320, 322, 327, 500, 526, 528, 1.1; 425/349, 395, 405, 403, 406, 467, 425, 808, DIG. 60, DIG. 110, DIG. 246, DIG. 38

(56) References Cited

U.S. PATENT DOCUMENTS

| 2,304,664 | A | | 12/1942 | Smith |
| 4,364,878 | A | | 12/1982 | Laliberte et al. |
| 4,540,534 | A | * | 9/1985 | Grendol ................. 264/2.2 |
| 4,569,807 | A | | 2/1986 | Boudet |
| 4,933,119 | A | | 6/1990 | Weymouth, Jr. |
| 5,075,051 | A | | 12/1991 | Ito et al. |
| 5,297,951 | A | * | 3/1994 | Asai ..................... 425/556 |
| 5,376,317 | A | * | 12/1994 | Maus et al. ............. 264/40.6 |
| 5,458,820 | A | * | 10/1995 | Lefebvre ................ 264/1.7 |
| 6,180,033 | B1 | * | 1/2001 | Greshes ................. 264/1.32 |

FOREIGN PATENT DOCUMENTS

| FR | 2 525 525 | 10/1983 |
| GB | 572748 | 10/1945 |
| JP | 62095210 | 5/1987 |
| WO | 99/24243 | 5/1999 |
| WO | 01/43953 | 6/2003 |

* cited by examiner

Primary Examiner—J. A. Lorengo
(74) Attorney, Agent, or Firm—Young & Thompson

(57) ABSTRACT

The mold comprises two dies mounted in a sheath to slide along the axis of the sheath and each presenting a forming face facing the other. The two dies and the sheath are provided with intrinsic heat transfer means.

A parison or preform of said thermoplastic material is placed between the two dies and the assembly is enclosed in the sheath; the dies and the sheath are heated by their intrinsic heat transfer means up to a forming temperature;

The dies are moved towards each other to shape the material by plastic deformation until a predetermined relative position is reached corresponding to the thickness desired for the lens; the dies and the sheath are cooled by their intrinsic heat transfer means down to an unmolding temperature; and the finished lens is extracted from the mold.

19 Claims, 1 Drawing Sheet

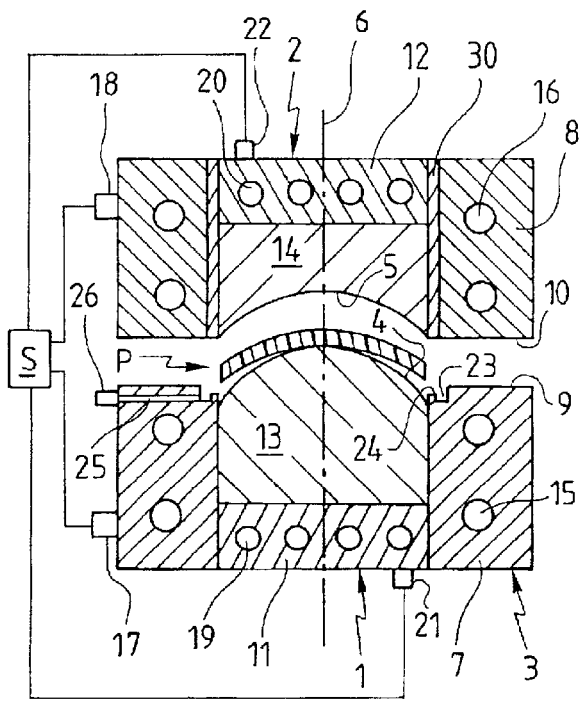
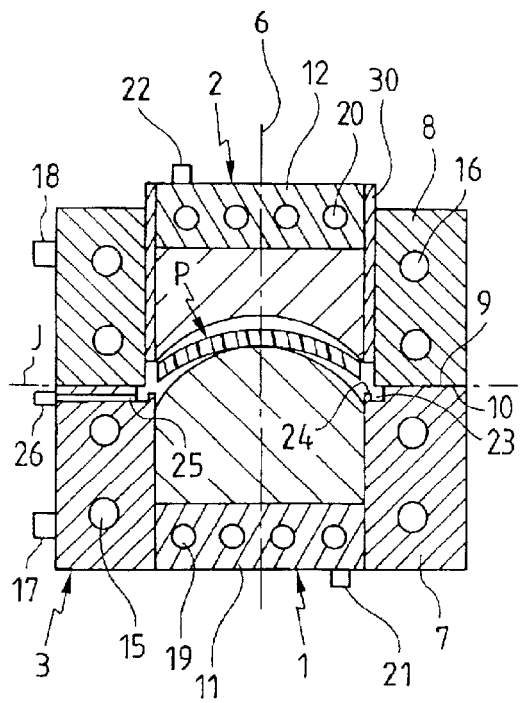
Fig. 1  Fig. 2
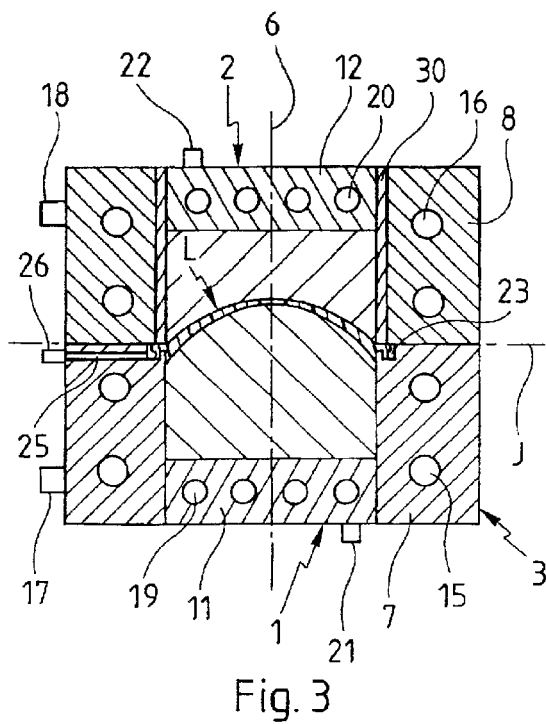
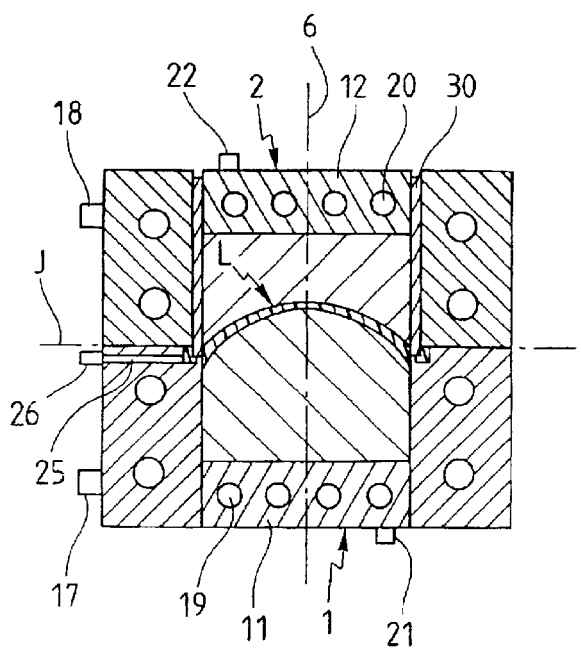
Fig. 3  Fig. 4

MOLD AND A METHOD OF HOT-FORMING A THERMOPLASTIC LENS

The present invention relates to manufacturing thermoplastic lenses, such as ophthalmic lenses or instrument lenses, obtained by appropriate molding (known as "forming") of a plastics material, in particular a thermoplastic resin, such as polymethyl methacrylate, polycarbonate, polycarbonate copolymer, polynorbornene, polystyrene, cyclic polyolefins and their copolymers, etc.

BACKGROUND OF THE INVENTION

When making lenses by a method of this kind, it is known to take advantage of the ability possessed by plastics materials to deform when heated in order to impart the desired shape to said lenses. Starting from a mass of thermoplastic material of standard shape (commonly referred to as a "parison") or from a special preform of a shape that is close to the desired shape, this shaping is performed by forming under pressure between two dies that are pressed by means of a press against the material that has previously been heated to the plastic state. The dies are generally made of stainless steel and each has a forming face possessing suitable curvature(s), corresponding to the curvature(s) to be given to the finished lens, and presenting optical polish, i.e. analogous to a mirror polish.

To obtain lenses possessing optical qualities suitable for their function, various precautions must be taken during manufacture, in particular in order to avoid irregular deformations or the presence of internal tensions, said deformations or tensions giving rise to anisotropy or to undesirable aberrations.

In this respect, special care is taken in making molding dies. Furthermore, it is often recommended to perform manufacture in two successive stages: firstly a blank is made to dimensions that are close to those of the desired lens, e.g. by injection molding, forming, or machining, and then the blank is finished by hot-forming.

These precautions relating to the tooling and the method of operation must also be associated with precautions relating to the heating of the plastics material and of the mold during forming. Ordinarily, heating is provided by the dies themselves, which dies are arranged to receive a heating fluid or gas, or electrical resistances. The heat provided by hot fluid flow or by electrical resistances spreads throughout the mass of the dies and is communicated by the walls thereof to the plastics material while it is being formed.

Heating in that way presents drawbacks in practice.

Firstly, it does not ensure that the plastics material is heated in regular and uniform manner as would be desirable to avoid internal tensions. Different portions of the dies and, as a result, of the material to be shaped, are brought only progressively and unevenly to the temperature required for forming. This lack of uniformity in the transmission of heat also occurs during cooling after forming.

This unequal heating and cooling at various points of the shaped material causes the resulting optical lens to retain deformations and tensions that often make it unsuitable for its intended optical purposes.

Furthermore, in usual arrangements, the dies for receiving the heating and cooling devices are fixed on the press, and it is in consideration of this arrangement that connections are provided with heating fluid feeds or with electricity feeds. With installations of that kind, the operations of installing and removing dies are lengthy and complicated.

Another method of heating that seeks to mitigate those drawbacks consists in using external heater means that are not part of the mold itself, and in particular not part of the dies. The mold containing the preform or parison is thus heated separately from the press prior to being installed therein for the forming operation. Nevertheless, the fact of the mold being heated separately from the press by external means, although it does indeed enable the dies to be free of any hydraulic or electrical connection, nevertheless suffers from the major drawback of requiring the mold to be handled in each cycle, thereby considerably slowing down production throughput. In addition, the temperature of the mold cannot be controlled during forming and no provision is made for cooling the mold after forming, so like heating, cooling can be envisaged only by using external means, thus requiring further handling.

In order to enable the mold to be taken from a heating station to the forming station (i.e. the press), the mold has a sheath covering the dies and within which the dies are slidably mounted. The function of the sheath is then to ensure that the mold constitutes a mechanical unit by providing a mechanical connection between the two dies independently of the press.

OBJECTS AND SUMMARY OF THE INVENTION

The invention provides a mold for hot-forming a thermoplastic lens, the mold comprising two dies mounted in a sheath to slide along the axis of the sheath, and each presenting a transverse forming face facing the other, in which mold the two dies and the sheath are provided with intrinsic and both-way heat transfer means (i.e. for heating and for cooling). For example, the heat transfer means can comprise an internal circuit for circulating a heat-conveying fluid.

This combines two advantages. Firstly, encasing the dies in a sheath whose temperature is self-modulated makes it possible to improve the quality and in particular the uniformity of the heating or cooling of the mold, and as a result of the thermoplastic material. The sheath thus performs a thermal containment function optionally associated with its function of providing the two dies with mechanical guidance relative to each other. In addition, integrating both-way heat transfer means in the main portions of the mold, i.e. the dies and the sheath, makes it possible to provide both heating and cooling of the mold in application of an optimized temperature regulation relationship, without it being necessary to move the mold in order to subject it to the action of external heating and/or cooling means.

According to an advantageous characteristic of the invention, each of the dies comprises:

a base containing at least a fraction of the heat transfer means of said die, and means for connecting them to a heat transfer source; and a removable insert fitted to the base and carrying the forming face.

The insert is thus interchangeable and as a result can be selected from a pre-established set or even manufactured on demand as a function of the surface definition desired for the lens. The insert is quick and easy to install in and remove from the mold, given that the connection to the temperature regulation source takes place via the base and therefore does not need to be removed.

In which case, it is advantageous for the base of each die to receive all of the heat transfer means of said die, and for the insert having no such means to be temperature regulated solely by transferring heat to and from the base. Mounting the insert on the base therefore does not require any hydraulic or electrical connection, whether with the temperature regulation source or with the base.

The invention also provides a method of hot-forming a thermoplastic lens by means of the above-defined mold, the method comprising the steps of:

placing a parison or preform of said thermoplastic material between the two dies and enclosing the assembly in the sheath;

heating the dies and the sheath by their intrinsic heat transfer means up to a forming temperature;

moving the dies towards each other to shape the material by plastic deformation until a predetermined relative position is reached corresponding to the thickness desired for the lens;

cooling the dies and the sheath by their intrinsic heat transfer means down to an unmolding temperature; and extracting the finished lens from the mold.

Preferably, the forming temperature is higher than or equal to the vitreous transition temperature of the thermoplastic material used, good results have been obtained more precisely with a forming temperature exceeding the vitreous transition temperature by a difference lying in the range 30° F. to 120° F., and preferably about 45° F.

Conversely, it is preferable for the unmolding temperature to be significantly below the vitreous transition temperature. For example an unmolding temperature can be provided which presents with respect to the vitreous transition temperature a difference lying in the range 20° F. to 50° F., and preferably about 35° F. It is indeed interesting not to cool too much the mold, so as to reduce as far as possible the time of each cycle.

According to another advantageous characteristic of the invention, the sheath possesses an annular recess that is open to the inside and that communicates with the interstitial gap defined by the forming faces of the two dies. This annular recess is designed to receive the excess plastics material which, after forming, constitutes peripheral flash projecting sideways from the dies.

The interstitial gap defined by the forming faces of the two dies co-operates with the annular recess to form a hermetically closed inside volume which is connected to the outside via at least one suction channel passing through the sheath and opening out, for example, into the annular recess.

In a mold presenting this characteristic, it is advantageous to proceed as follows: before and/or simultaneously with movement of the dies towards each other for the purpose of shaping the material by deforming it plastically, said suction channel is used to establish a relative vacuum in the hermetically closed inside volume of the mold.

Best results are obtained with a relative vacuum of lower than 0.25 bar, and preferably lying in the range 0 to 0.1 bar.

According to another advantageous characteristic of the invention, the mold has a trimming ring slidably mounted in the sheath and optionally co-operating with a lip bordering the annular recess.

In a mold presenting this characteristic, it is advantageous to proceed as follows: after the material has been fully formed by moving the dies towards each other, the trimming ring is actuated to cut off the peripheral flash formed by surplus material projecting sideways from the dies.

According to yet another advantageous characteristic of the invention, the sheath has two portions mounted to slide relative to each other along the same sliding axis as the dies between firstly an open configuration giving direct access to the interstitial gap defined by the forming faces of the two dies, in particular for the purpose of inserting the perform or parison between the two dies and for removing the finished lens after forming, and secondly a closed configuration in which the two portions are in contact via junction faces in a transverse join plane.

The annular recess of the sheath is then advantageously in the form of a groove or setback, preferably with draft taper, in the junction face of at least one of the two portions of the sheath.

BRIEF DESCRIPTION OF THE DRAWING

Other characteristics and advantages of the invention will appear on reading the following description of a particular embodiment given by way of non-limiting example.

Reference is made to the accompanying drawings, in which FIGS. 1 to 4 are diagrammatic section views through a mold of the invention showing successive steps in the forming method of the invention.

MORE DETAILED DESCRIPTION

With reference to the figures, a mold of the invention for hot-forming a thermoplastic lens comprises two dies 1, 2 slidably mounted in a sheath 3, and each presenting a forming face 4, 5 facing the other. The sheath 3 has a central axis 6 defining the direction of relative sliding between the dies 1, 2.

More precisely, the sheath 3 comprises two portions 7, 8 mounted on an external support (not shown) e.g. associated with the frame of a press, so as to be slidable relative to each other along the axis 6 between firstly an open configuration as shown in FIG. 1 giving direct access to the interstitial gap defined by the forming faces 4, 5 of the two dies, and secondly a closed configuration as shown in FIGS. 2 to 4 in which the two portions 7, 8 are in contact via junction faces 9, 10 lying in a transverse join plane J.

Each of the two dies 1, 2 comprises a base 11, 12 and a removable insert 13, 14 fitted to the base and carrying the forming face 4, 5.

The two dies 1, 2 and the sheath 3 are provided with intrinsic heat transfer means, which are both-way i.e. suitable both for heating them and for cooling them. By way of example, the heat transfer means can be implemented, as shown, in the form of internal circuits for circulating a heat-conveying fluid such as an oil. There can thus be seen helical circuits 15, 16 formed in the portions 7, 8 of the sheath 3 and spiral circuits 19, 20 formed in the bases 11, 12 of the dies 1, 2.

The base 11, 12 of each die thus receives all of the heat transfer means of said die: the insert 13, 14 has no such means and its temperature is regulated solely by heat transfer with the base.

The two portions 7, 8 of the sheath 3 and the bases 11, 12 of the dies are provided with couplings 17, 18 and 21, 22 enabling the circuits 15, 16 and 19, 20 to be connected to a common external temperature regulation source S or to a plurality of sources which are distinct and independent so as to regulate the various portions of the mold independently of one another. In particular, provision can be made to connect firstly the circuits 15, 16 of the sheath 3 to a first source for providing temperature regulation of the two portions 7, 8 of the sheath 3, and secondly the circuits 19, 20 of the bases of the dies 1, 2 to a second source for providing temperature regulation of the dies, independently of the sheath 3.

The bottom portion 7 of the sheath 3 has an annular groove 23 formed as a setback in the junction face 9 of the bottom portion 7 of the sheath 3. This groove 23 is adjacent to the inside face of the portion 7 of the sheath 3 and is internally bordered by a circular rim 24 forming a flash-trimming lip, as explained in greater detail below. The groove 23 forms a small amount of draft taper.

When the sheath 3 is in its closed configuration with its two portions meeting via their junction faces 9, 10, the groove 23 is covered at least in part by the junction face 10 of the top portion of the sheath 3 so as to form an annular recess 23. Nevertheless, the top of the lip 24 is set back a little from the join plane J so as to leave a narrow gap leaving the recess 23 open to the inside of the sheath and in communication with the interstitial gap defined by the forming faces 4, 5 of the two dies 1, 2 where the preform or parison P is placed.

The interstitial gap defined by the forming faces 4, 5 of the two dies 1, 2 thus co-operates with the annular recess 23 to define a single and hermetically closed inside volume. A suction channel 25 is provided through the bottom portion 7 of the sheath 3 and extends transversely from the annular recess 23 to the outside face of the portion 7 of the sheath so as to enable said inside volume to be connected to the outside. A coupling 26 is provided on the outside face of the portion 7 of the sheath to couple the channel 25 to a vacuum pump (not shown) so as to establish a relative vacuum in said inside volume.

The mold also has a flash-trimming ring 30 slidably mounted in the top portion 8 of the sheath 3. More precisely, in the example shown, the ring 30 is in the form of a portion of a tube about the axis 6 and is interposed between the top die 2 and the top portion 8 of the sheath, with very small transverse clearance so as to provide accurate guidance for the top die 2, the ring 30, and the top portion 8 of the sheath relative to one another along the axis 6. The flash-trimming function of the ring 30 is explained in greater detail below.

To hot-form a thermoplastic lens by means of the mold as described above, the procedure is as follows.

A parison or preform P is placed between the two dies 1, 2. To do this, the starting configuration is as shown in FIG. 1, in which firstly the dies 1, 2 are far enough apart to enable the preform or parison P to be inserted between their forming faces 4, 5, and secondly the two portions 7, 8 of the sheath 3 are spaced apart from each other in an open configuration so as to enable the preform or parison P to be inserted directly between the dies without any need to separate the dies 1, 2 from the sheath 3.

The parison or preform P is made of a thermoplastic material such as polymethyl methacrylate, polycarbonate, polycarbonate copolymer, polynorbornene, polystyrene, cyclic polyolefins and their copolymers, etc.

The two portions 7, 8 of the sheath are then closed against each other, meeting via their junction faces 9, 10, as shown in FIG. 2 so as to form a single sheath 3. The sheath 3 thus completely surrounds both dies.

The dies 1, 2 and the sheath 3 are then heated or pre-heated by their intrinsic heat transfer means up to forming temperature. For this purpose, in the example shown, the heat-conveying fluid is heated by the external temperature regulation source(s) S and is caused to circulate in the circuits 15, 16, 19, 20.

The forming temperature is preferably higher than or equal to the vitreous transition temperature of the thermoplastic material used. Good results have been obtained in particular with a forming temperature that exceeds the vitreous transition temperature by an amount lying in the range 30° F. to 120° F., and preferably about 45° F.

It will be observed that during this heating, because of the presence of the intrinsic heat transfer means, the variation in temperature can be monitored and regulated so as to comply with a relationship for temperature variation as a function of time that is suitable for reducing internal tensions.

Once the desired temperature has been reached, the dies 1, 2 are moved towards each other as shown in FIG. 3 so as to shape the thermoplastic material that has been made malleable by the heat, and deform it plastically until a predetermined relative position has been reached that corresponds to the thickness desired for the lens.

Before and/or while the dies 1, 2 are being moved towards each other in order to shape the material by plastic deformation, the suction channel 25 and the vacuum pump (not shown) connected to the coupling 26 are used to establish a relative vacuum in the sealed inside volume of the mold, as defined above.

Best results have been obtained with a relative vacuum of lower than 0.25 bar, and preferably lying in the range 0 to 0.1 bar.

After the material has been fully shaped by moving the dies towards each other to obtain predetermined compression (configuration of FIG. 3), the trimming ring 30 is actuated to cut off the peripheral flash formed by surplus material that has flowed outwards during compression and that projects sideways from the dies 1, 2. For this purpose, the trimming ring 30 cooperates with the lip 24 forming a margin of the annular recess so as to act like a pincer (as shown), or in the alternative so as to act like a shear.

The dies 1, 2 and the sheath 3 are then cooled by means of their intrinsic heat transfer means, down to an unmolding temperature. For this purpose, and in the example shown, the heat-conveying fluid is cooled by the external regulation source(s) S and is caused to circulate in the circuits 15, 16, 19, 20.

It is preferable for the unmolding temperature to be significantly below the vitreous transition temperature. By way of example, provision can be made for the unmolding temperature to be less than half the vitreous transition temperature. It should be observed that during this cooling, as during heating, the intrinsic heat transfer means enable temperature variation to be monitored as regulated to comply with a relationship for temperature variation as a function of time which is suitable for reducing internal tensions.

Finally, it suffices to extract the finished lens L from the mold. For this purpose, the two portions 7, 8 of the sheath 3 are separated from each other as are the two dies 1, 2. Direct access is thus provided to the gap situated between the dies 1, 2 and to the finished lens L which rests on the bottom die 1. It then suffices to take hold of the lens L by means of a handling tool such as tongs for manual use or associated with an automatic handling arm.

It is also necessary to extract the peripheral flash that was cut off by the trimming ring 30 from the annular recess.

The mold described above can be used
- either individually in the production of lenses in small quantity or even one by one (or pair by pair), that is made to order to satisfy a prescription order,
- or in a mass production device including several molds of the same type for the hot-forming of a corresponding number of lenses at each cycle simultaneously.

Furthermore, starting from these main characteristics and steps of the mold and method according to the present invention, several variations or additions can be envisaged. These variations or additions, undermentioned, can be implemented separately or in combination with each other in order to directly obtain a finished or semi-finished coated, or at least treated, lens.

According to a first additional characteristic, the parison or preform P can advantageously be pre-coated with any single or multi layer coating before being placed between the two dies.

According to a second additional characteristic, before heating the dies and the sheath, a thermoplastic film is disposed between the parison or preform and at least one of the two dies. This thermoplastic film is then applied on and self-welded to the corresponding face of the lens by so called hot-lamination during the shaping step, similarly to the process described in the document WO99/24243 which is incorporated by reference to the present specification. Advantageously, the film can be coated with any single or multi layer coating. Alternatively or in combination with a coating associated with the film, the film can also be photochromic and/or polarized to provide the lens with corresponding properties. The film can also be tinted and/or colored.

According to a third additional characteristic, a single or multi layer coating can be disposed on at least one of the two dies before heating them. This coating is then hot-transferred on the corresponding face of the lens during the shaping step, similarly to the process described in the document U.S. Pat. No. 5,458,820 which is incorporated by reference to the present specification.

Broadly speaking, the invention is not limited to the particular embodiment described above, but on the contrary covers any variant using equivalent means to reproduce the essential characteristics of the invention. In particular, although the invention is described and shown with a mold whose intrinsic heat transfer means are integrally implemented in the form of an internal circuit for circulating a heat-conveying fluid, it is equally possible, without going beyond the ambit of the invention, to make such heat transfer means in any other known way, in particular concerning heating function by means of electrical resistances or by high frequency induction using coils, or by Infrared or Ultra-violet heating.

What is claimed is:

1. A method of hot-forming a thermoplastic lens, the method comprising the steps of:
   providing a mold comprising two dies mounted in a sheath to slide along the axis of the sheath, and each presenting a transverse forming face facing the other, the two dies and the sheath being provided with intrinsic and both-way heat transfer means;
   placing a parison or preform of said thermoplastic material between the two dies and enclosing the assembly in the sheath;
   heating the dies and the sheath by their intrinsic heat transfer means up to a forming temperature;
   moving the dies towards each other to shape the material by plastic deformation until a predetermined relative position is reached corresponding to the thickness desired for the lens;
   cooling the dies and the sheath by their intrinsic heat transfer means down to an unmolding temperature; and
   extracting the finished lens from the mold.

2. A forming method according to claim 1, in which the forming temperature is greater than or equal to the vitreous transition temperature of the thermoplastic material used.

3. A forming method according to claim 2, in which the forming temperature exceeds the vitreous transition temperature of the thermoplastic material used by an amount lying in the range 30° F. to 120° F.

4. A forming method according to claim 3, in which the forming temperature exceeds the vitreous transition temperature of the thermoplastic material used by an amount of about 45° F.

5. A forming method according to claim 1, in which the unmolding temperature is significantly below the vitreous transition temperature.

6. A forming method according to claim 5, in which the unmolding temperature presents with respect to the vitreous transition temperature a difference lying in the range 20° F. to 50° F.

7. A forming method according to claim 6, in which the unmolding temperature presents with respect to the vitreous transition temperature a difference of about 35° F.

8. A forming method according to claim 1, using a mold in which the interstitial gap defined by the forming faces of the two dies co-operates with the annular recess to form a sealed inside volume which is connected to the outside via at least one suction channel passing through the sheath, including, before and/or simultaneously with the dies being moved towards each other in order to shape the material by plastic deformation, a step of establishing a relative vacuum in the sealed inside volume of the mold by means of the suction channel.

9. A forming method according to claim 8, in which the relative vacuum is lower than 0.25 bar.

10. A forming method according to claim 9, in which the relative vacuum lies in the range 0 to 0.1 bar.

11. A forming method according to claim 1, and using a mold including a trimming ring slidably mounted in the sheath, including, after the material has been fully shaped by moving the dies towards each other, a step of actuating the trimming ring to cut off the peripheral flash formed by the surplus material projecting sideways from the dies.

12. A forming method according to claim 1, including a step of pre-coating said parison or preform with any single or multi layer coating before being placed between the two dies.

13. A forming method according to claim 1, including, before heating the dies and the sheath, a step of disposing a thermoplastic film between the parison or preform and at least one of the two dies, said thermoplastic film being applied and self-welded to the corresponding face of the lens during the shaping step.

14. A forming method according to claim 13, including a step of coating the film with any single or multi layer coating.

15. A forming method according to claim 13, including a step of providing a photochromic film.

16. A forming method according to claim 13, including a step of providing a polarized film.

17. A forming method according to claim 13, including a step of providing a tinted and/or colored film.

18. A forming method according to claim 1, including a step of disposing a single or multi layer coating on at least one of the two dies before heating them, this coating being then hot-transferred on the corresponding face of the lens during the shaping step.

19. A method of hot-forming a thermoplastic lens, the method comprising the steps of:
   providing a hot-forming mold comprising two opposing dies mounted in a sheath that slide along an axis of the sheath, each of the two dies presenting a transverse forming face facing the other, the two dies and the sheath each having a respective intrinsic and both-way heat transfer device;

placing a preformed thermoplastic material between the two dies and then enclosing the material in the sheath;

then, heating the two dies and the sheath by the respective intrinsic heat transfer device up to a forming temperature;

moving the dies towards each other to shape the material by plastic deformation until a predetermined relative position is reached corresponding to the thickness desired for a finished lens;

cooling the dies and the sheath by the respective intrinsic heat transfer device down to an unmolding temperature; and extracting the finished lens from the mold.

* * * * *